(12) United States Patent
Zhang et al.

(10) Patent No.: US 7,010,410 B2
(45) Date of Patent: Mar. 7, 2006

(54) ELECTRONICALLY CONTROLLED HYDRAULIC BRAKE SYSTEM

(75) Inventors: Jicheng Zhang, Kanagawa (JP); Hideo Nakamura, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 163 days.

(21) Appl. No.: 10/782,804

(22) Filed: Feb. 23, 2004

(65) Prior Publication Data

US 2004/0167698 A1   Aug. 26, 2004

(30) Foreign Application Priority Data

Feb. 24, 2003   (JP)   ............................. 2003-045824

(51) Int. Cl.
*B60T 7/12*   (2006.01)
(52) U.S. Cl. ............................. 701/70; 701/78; 303/3; 303/11
(58) Field of Classification Search ............... 701/70, 701/71, 78; 303/2, 3, 11, 115.4, 115.5, 116.1
See application file for complete search history.

(56) References Cited

U.S. PATENT DOCUMENTS

| | | | |
|---|---|---|---|
| 4,761,741 A * | 8/1988 | Agarwal et al. ............... 701/78 |
| 5,788,337 A | 8/1998 | Eckert | |
| 6,082,830 A * | 7/2000 | Volz et al. ................ 303/113.4 |
| 6,318,817 B1 * | 11/2001 | Martin et al. ............ 303/116.1 |
| 6,446,490 B1 | 9/2002 | Lohner et al. | |
| 6,499,812 B1 | 12/2002 | Gronau et al. | |
| 6,522,966 B1 | 2/2003 | Nakano | |

FOREIGN PATENT DOCUMENTS

JP   2001-301592 A   10/2001

* cited by examiner

*Primary Examiner*—Gary Chin
(74) *Attorney, Agent, or Firm*—Foley & Lardner LLP (57) ABSTRACT

An electronically controlled hydraulic brake system is configured to obtain an attainment brake hydraulic pressure which can be achieved when a motor drive current command value is applied to a pressure increasing pump motor, to set a virtual initial pressure of the brake hydraulic pressure, to obtain a linear compensation executed attainment brake hydraulic pressure by linearly compensating the attainment brake hydraulic pressure using the actual brake hydraulic pressure, to calculate an ideal flow rate of the pressure increasing pump from a hydrodynamic flow rate equation, to obtain the linear compensation executed attainment brake hydraulic pressure by executing an inverse calculation of the flow rate equation from the ideal flow rate and the actual brake hydraulic pressure, and to obtain a linear compensation executed motor drive current command value by executing an inverse calculation of the calculation for obtaining the linear compensation executed attainment brake hydraulic pressure.

11 Claims, 12 Drawing Sheets

$i_M$: PUMP DRIVE MOTOR CURRENT [A] (PROPORTION TO DUTY RATIO)

$T_M$: PUMP DRIVE MOTOR AXIAL TORQUE [N·s]

F: FORCE APPLIED TO CROSS-SECTION A [N]

A: PISTON CROSS SECTIONAL AREA [m²]

$P_M$: ORIFICE UP STREAM PRESSURE [MPa] (PROPORTION TO PISTON INNER PRESSURE, PUMP DRIVE MOTOR CURRENT)

$P_{wc}$: ORIFICE DOWN STREAM PRESSURE [MPa] (HYDRAULIC PRESSURE)

$A_M$: PUMP ORIFICE OPENING CROSS-SECTION [m²]

$Q_M$: PUMP VOLUMETRIC FLOW RATE [m³/s]

$C_M$: PRESSURE INCREASING SIDE FLOW RATE COEFFICIENT $Q_M$: FLUID DENSITY [kg/m³]

PUMP FLOW RATE MODEL:

$$Q_M = C_M A_M \sqrt{\frac{2}{\rho} \{P_M(i_M) - P_{wc}\}}$$

FIG.12
(RELATED ART)

ELECTRONICALLY CONTROLLED HYDRAULIC BRAKE SYSTEM

BACKGROUND OF THE INVENTION

The present invention relates to an electronically controlled hydraulic brake system which increases a brake hydraulic pressure by supplying brake fluid into a brake hydraulic pressure line by means of an electronically controlled pressure increasing pump, and more particularly to a method of controlling a drive current command value of a motor for the pressure increasing pump so as to linearly compensate a non-linear characteristic of the brake hydraulic pressure.

Figure 10:
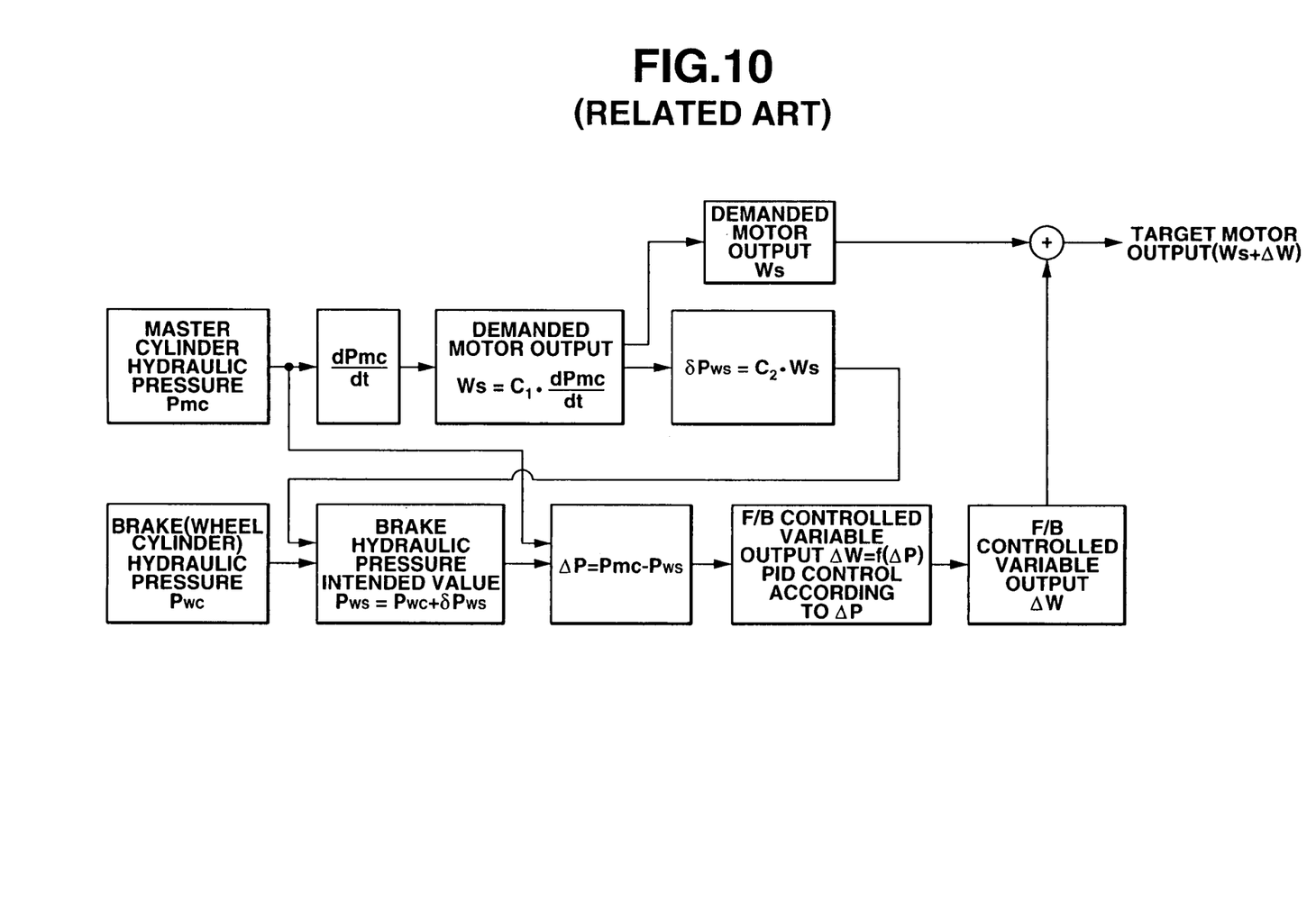
FIG. 10 is a block diagram showing a pump drive motor of an electronically control hydraulic brake control system of a related art.

Japanese Published Patent Application No. 2001-301592 discloses an electronic control system for a pump drive motor in an electronically controlled hydraulic brake system shown in FIG. 10. This electronic control system is arranged to obtain a demand motor output (feedforward controlled variable) Ws by multiplying a rate dPmc/dt of change (changing speed) of a master cylinder hydraulic pressure (brake hydraulic pressure command value) Pmc and a coefficient C1 according to the rate of change of an actual brake (wheel cylinder) hydraulic pressure, to obtain an increasing quantity δPws due to demand motor output Ws by multiplying the demand motor output Ws and a constant C2, to obtain a brake hydraulic pressure estimated value Pes by adding actual brake (wheel cylinder) hydraulic pressure Pwc to the obtained increasing quantity δPws, and to obtain a motor output feedback controlled variable ΔW necessary for eliminating a brake hydraulic pressure difference ΔP by executing a feedback calculation such as a PID control according to a difference ΔP between break hydraulic pressure estimated value Pes and brake hydraulic pressure command value (master cylinder hydraulic pressure) Pmc. Further, the brake control system is arranged to control the motor by setting a target motor output at a sum of demand motor output (feedforward controlled variable) Ws and motor output feedback controlled variable ΔW so as to obtain the desired output.

SUMMARY OF THE INVENTION

Figure 11:
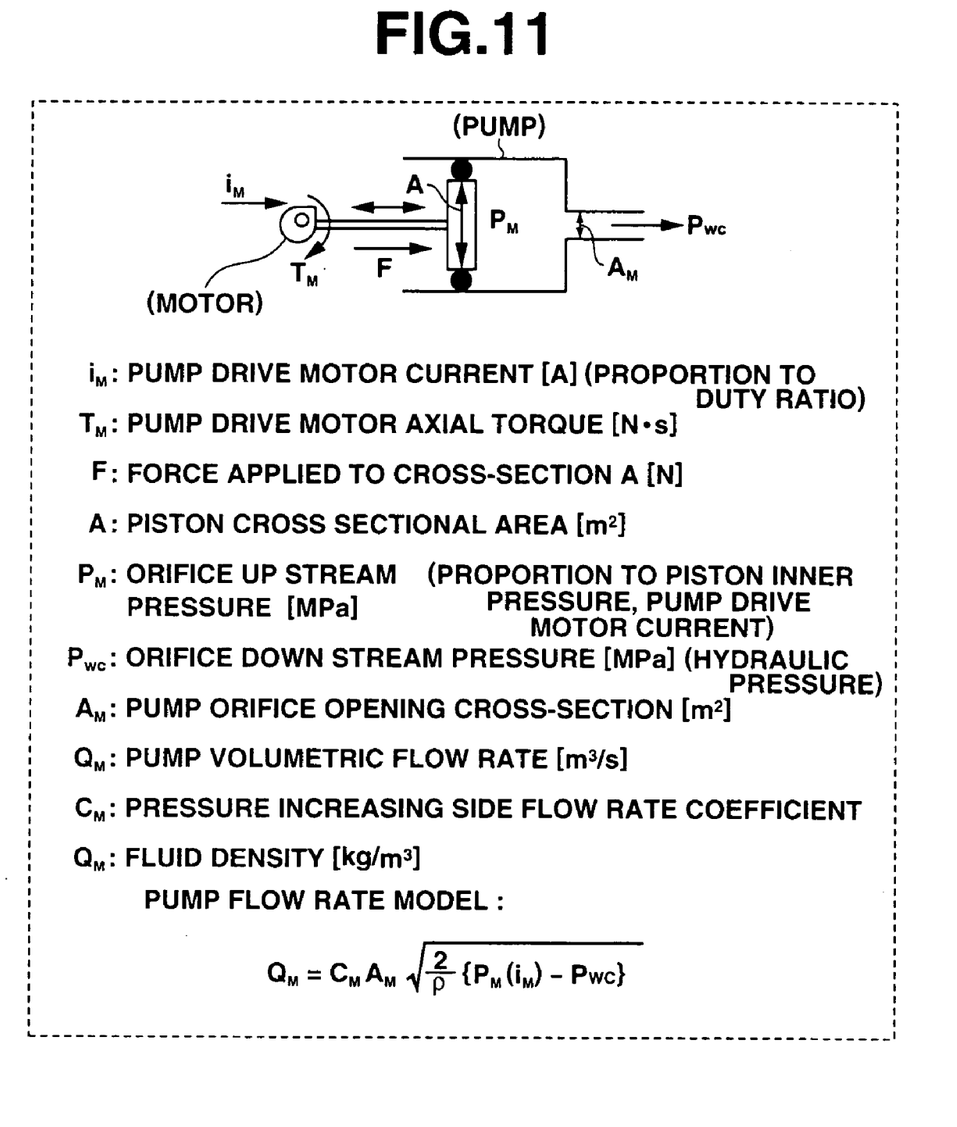
FIG. 11 is an explanatory view for a pressure increasing pump flow model.
Figure 12:
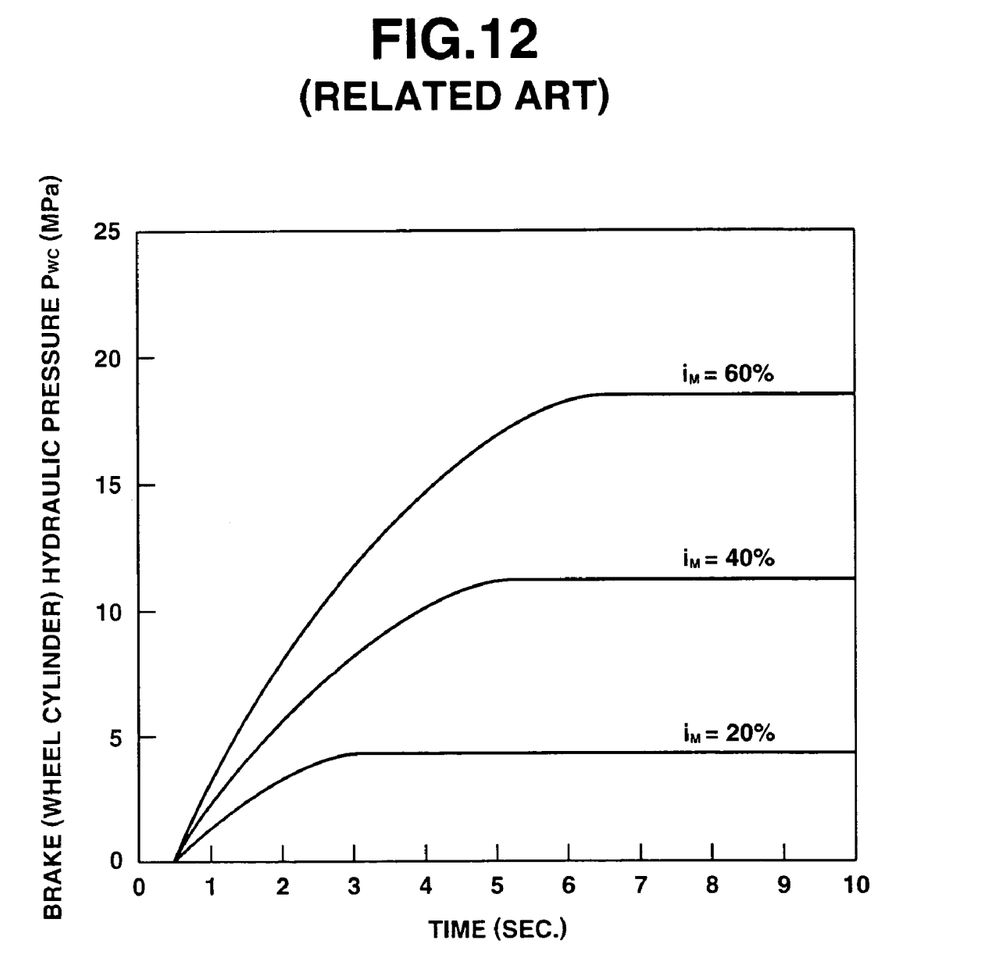
FIG. 12 is a time chart showing a time-series variation of a brake hydraulic pressure in case of not employing the liner compensator.

A flow rate model of a pressure increasing pump, such as a flow rate characteristic ($Q_M$) of the modeled pressure increasing pump can be mathematically expressed as shown in FIG. 11. However, a time series variation characteristic of brake hydraulic pressure (wheel cylinder hydraulic pressure) Pwc in the modeled pressure increasing pump is normally represented as shown in FIG. 12 in which there are shown characteristic curves of 20%, 40% and 60% pump motor drive duties (corresponding to drive currents) $i_M$. As is apparent from FIG. 12, a time series variation characteristic of brake hydraulic pressure Pwc exhibits a non-linear characteristic such that time change rates θ1, θ2 and θ3 of brake hydraulic pressure Pwc increases as the brake hydraulic pressure increases, and an attainment brake hydraulic pressure (saturated pressure), which is a maximum brake hydraulic pressure attained when motor drive current $i_M$ is applied, increases as motor drive current $i_M$ increases.

Accordingly, in case that coefficient C1, which is employed for obtaining the demand motor output Ws by multiplying the coefficient C1 and the rate dPmc/dt of change of mater cylinder hydraulic pressure Pmc, varies according to the rate of change of actual brake hydraulic pressure, it is possible to linearly compensate the non-linear characteristic of brake hydraulic pressure Pwc in some degree before brake hydraulic pressure Pwc reaches the attainment brake hydraulic pressure since time change rates θ1, θ2 and θ3 of hydraulic pressure Pwc are not zero. However, it is impossible to linearly compensate the non-linear characteristic of brake hydraulic pressure Pwc after brake hydraulic pressure Pwc reached the attainment brake hydraulic pressure since time change rates θ1, θ2 and θ3 of hydraulic pressure Pw are zero.

Figure 9:
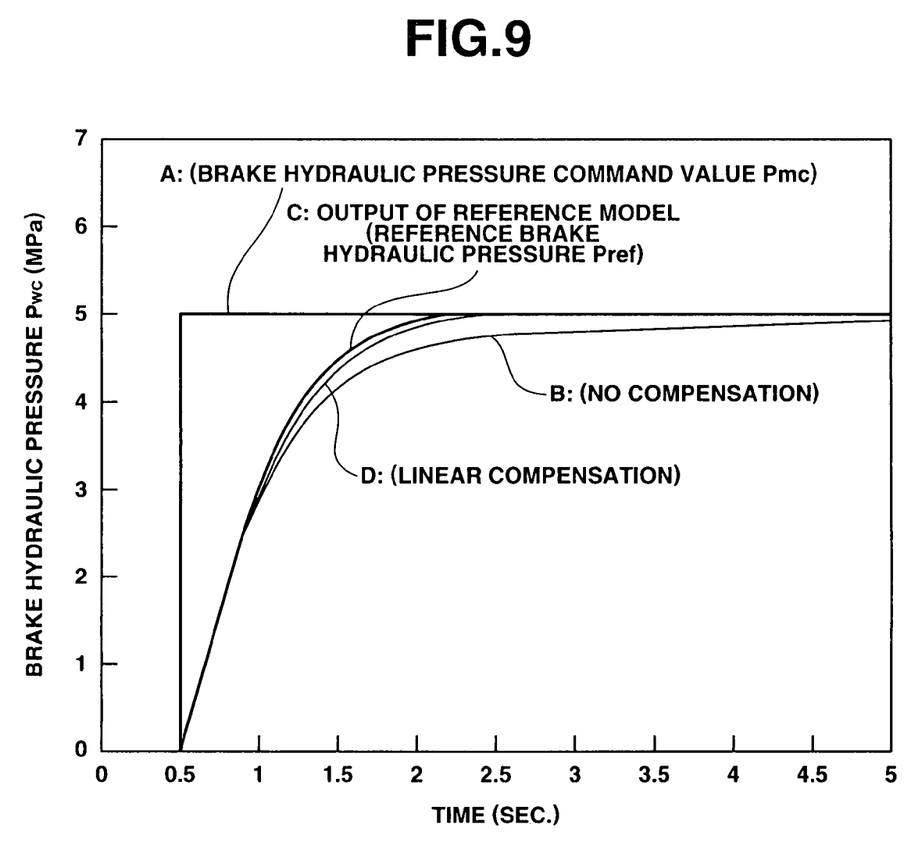
FIG. 9 is a time chart showing step responses of the brake hydraulic pressure in case of employing the linear compensator shown in FIGS. 5A and 5B, of employing the linear compensator shown in FIG. 6 and of not employing the linear compensator.

Accordingly, in case that brake hydraulic pressure (mater cylinder hydraulic pressure) Pmc is applied stepwise as shown by a curve A in FIG. 9, the response characteristic of brake hydraulic pressure Pwc generates a large response delay as shown by a curve B in FIG. 9, due to the non-linear characteristic shown in FIG. 12. This response delay causes a problem relating to the degradation of the brake response.

It is therefore an object of the present invention to provide an improved electronically controlled hydraulic brake system which solves the problem as to the brake response so as to securely execute the linear compensation of the non-linear characteristic of the brake hydraulic pressure by employing a specific idea in producing the motor drive current command value for the motor of a pressure increasing pump.

An aspect of the present invention resides in an electronically controlled hydraulic brake system, which comprising a pressure increasing pump which increases a brake hydraulic pressure in a brake hydraulic line; a motor which is connected to the pressure increasing pump and is controlled on the basis of a motor drive current command value obtained from a target brake hydraulic pressure to bring the brake hydraulic pressure to the target brake hydraulic pressure; a pressure detector which detects an actual hydraulic pressure in the brake hydraulic line; and a controller connected to the motor and the pressure detector. The controller is arranged to calculate an attainment brake hydraulic pressure, which is a maximum brake hydraulic pressure attained when the motor operates in response to a motor drive current command value, to obtain a linear compensation executed attainment brake hydraulic pressure by linearly compensating the attainment brake hydraulic pressure using the actual brake hydraulic pressure, to obtain a linear compensation executed motor drive current command value by executing an inverse calculation of the calculation for obtaining the linear compensation executed attainment brake hydraulic pressure on the basis of the linear compensation executed attainment brake hydraulic pressure, and to control the motor based on the linear compensation executed motor drive current command value.

Another aspect of the present invention resides in an electronically controlled hydraulic brake system which electronically controls a brake hydraulic pressure in a brake hydraulic line for a vehicle by outputting a motor drive current command value to a motor of a pressure increasing pump for increasing the brake hydraulic pressure. The electronically controlled hydraulic brake system comprises a controller which is arranged to execute a linear compensation of a maximum brake hydraulic pressure attained when the motor operates in response to a motor drive current command value, and to obtain the motor drive current command value by executing an inverse calculation of the calculation for obtaining the linear compensation executed maximum brake hydraulic pressure.

A further aspect of the present invention resides in a method of electronically controlling a brake hydraulic pressure in a brake hydraulic line through a control of a motor of a pressure increasing pump which increases the brake hydraulic pressure. The method comprises an operation for calculating an attainment brake hydraulic pressure, which is a maximum brake hydraulic pressure attained when a motor of a pressure increasing pump operates in response to a motor drive current command value, an operation for obtaining a linear compensation executed attainment brake hydraulic pressure by linearly compensating the attainment brake hydraulic pressure using an actually detected brake hydraulic pressure in the brake hydraulic line, an operation for obtaining a linear compensation executed motor drive current command value by executing an inverse calculation of the calculation for obtaining the linear compensation executed attainment brake hydraulic pressure on the basis of the linear compensation executed attainment brake hydraulic pressure, and an operation for controlling the motor based on the linear compensation executed motor drive current command value.

The other objects and features of this invention will become understood from the following description with reference to the accompanying drawings.

DETAILED DESCRIPTION OF THE INVENTION

Figure 1:
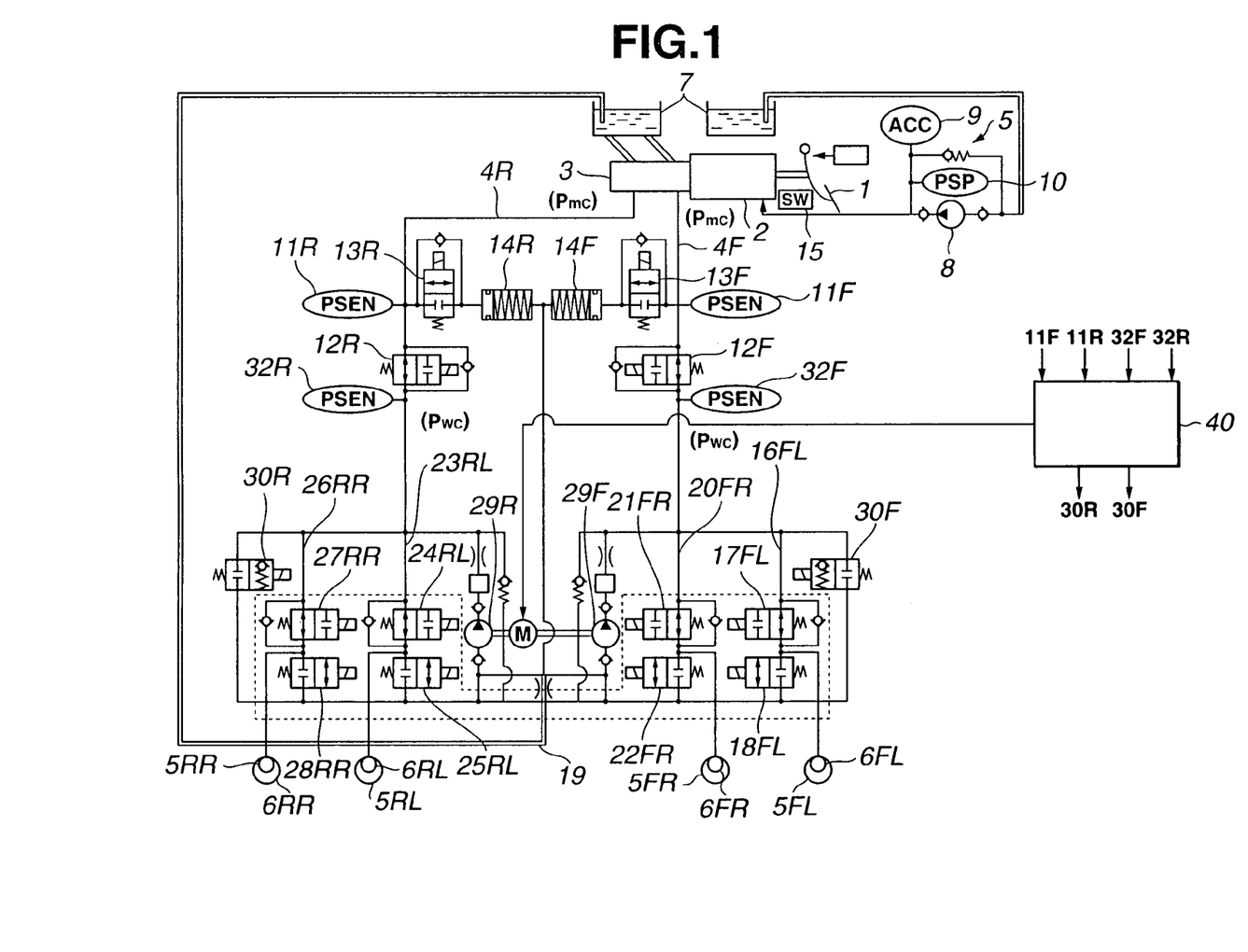
FIG. 1 is a system view of an electronically controlled hydraulic brake control system according to an embodiment of the present invention.

Referring to the drawings, there is discussed an embodiment of an electronically controlled hydraulic brake system according to the present invention. FIG. 1 shows a system view of the electronically controlled hydraulic brake system for a vehicle according to the embodiment of the present invention. This electronically controlled hydraulic brake control system is applicable to a coordinated regenerative brake control system wherein a brake hydraulic pressure and a regenerative brake employing an alternating-current synchronous motor (not shown) are coordinately controlled. Further, the electronically controlled hydraulic brake control system comprises a front-wheel brake hydraulic pressure line and a rear-wheel brake hydraulic pressure line, so as to be coordinately controlled with the regenerative-brake motor provided for front wheels or rear wheels and to be adapted to a front and rear split line arrangement. Accordingly, the electronically controlled hydraulic brake system is capable of independently controlling the hydraulic pressures of these two lines even when the hydraulic brake system is controlled independent from the brake manipulating force of a driver.

When the driver depresses a brake pedal 1 to generate a driver intended braking force, the depression force of brake pedal 1 is boosted by a hydraulic booster 2. The boosted force pushes a piston cup (not shown) of a master cylinder 3, and therefore, master cylinder 3 outputs a master cylinder hydraulic pressure Pmc according to the depression level of brake pedal 1 to a front-wheel brake hydraulic pressure line 4F and a rear-wheel brake hydraulic pressure line 4R. Front-wheel brake hydraulic pressure line 4F constructs a front-wheel brake hydraulic system for left and right front-wheel cylinders 6FL and 6FR. Rear-wheel brake hydraulic pressure line 4R constructs a rear-wheel brake hydraulic system for left and right rear-wheel cylinders 6RL and 6RR.

Hydraulic booster 2 and master cylinder 3 employ brake fluid, which is commonly or independently returned to reservoir(s) 7. Hydraulic booster 2 is connected with a pump 8, which sucks brake fluid from reservoir 7 and discharges the brake fluid to accumulator 9 so as to be able to always apply the pressurized brake fluid at a preset pressure to master cylinder 3. The pressure of brake fluid in accumulator 9 is controlled by means of a sequence control of a pressure switch 10. Hydraulic booster 2 boosts the depression force of brake pedal 1 with an assist from the pressure of accumulator 9. The boosted force pushes the piston cup (not shown) of a master cylinder 3. Master cylinder 3 generates master cylinder hydraulic pressure Pmc corresponding to the depression level of brake pedal 1 by sealing the pressurized brake fluid supplied from reservoir 7 in a front-wheel brake hydraulic pressure line 4F and a rear-wheel brake hydraulic pressure line 4R, as discussed later. Pressure sensors 11F and 11R respectively detect the master cylinder pressures Pmc in front-wheel and rear-wheel brake hydraulic pressure lines 4F and 4R, and outputs signals indicative of master cylinder pressures Pmc to a brake hydraulic pressure controller 40. Controller 40 electronically controls the front wheel brake hydraulic pressure and the rear wheel brake hydraulic pressure based on the detected master cylinder pressures Pmc.

Normal-open type electromagnetic valves 12F and 12R are disposed in front-wheel brake hydraulic pressure line 4F and rear-wheel brake hydraulic pressure line 4R, respectively, and are electronically connected to controller 40. Normal-close type electromagnetic valves 13F and 13R are disposed in front-wheel brake hydraulic pressure line 4F between master cylinder 3 and normal-open type electromagnetic valve 12F and rear-wheel brake hydraulic pressure line 4R between master cylinder 3 and normal-open type electromagnetic valve 12R, respectively. Further, stroke simulators 14F and 14R are connected to normal-close type electromagnetic valves 13F and 13R, respectively. Accordingly, when normal-open type electromagnetic valves 12F and 12R and normal-close type electromagnetic valves 13F and 13R are put in the respective normal states, that is, when normal-open type electromagnetic valves 12F and 12R are put in an open state and when normal-close type electromagnetic valves 13F and 13R are put in a closed state, master cylinder hydraulic pressure Pmc is directly supplied to the corresponding wheel cylinder(s). This arrangement functions as a fail-safe system when it becomes impossible to electronically control front-wheel brake hydraulic pressure (Pwc) and rear-wheel brake hydraulic pressure (Pwc).

When brake pedal 1 is depressed for the braking of the vehicle, normal-open type electromagnetic valves 12F and 12R and normal-close type electromagnetic valves 13F and 13R are all turned on in response to the on signal of brake switch 15. By these turning-on operations of all valves 12F, 12R, 13F and 13R, normal-open type electromagnetic valves 12F and 12R are closed and normal-close type electromagnetic valves 13F and 13R are opened. Since normal-open type electromagnetic valves 12F and 12R are closed, master cylinder pressure Pmc according to the depression force of brake pedal 1 is generated in portions of front-wheel and rear-wheel brake hydraulic lines 4F and 4R between master cylinder 3 and normal-open type electromagnetic valves 12F and 12R while being received at stroke simulators 14F and 14R functioning as a reaction force receiver. At this moment, the driver can have a brake pedal manipulating feeling as same as that in a normal state, due to the reaction force of stroke simulators 14F and 14R. Further, pressure sensors 11F and 11R detect master cylinder Pmc.

Portions of front-wheel and rear-wheel brake hydraulic lines 4F and 4R downstream of normal-open type electromagnetic valves 12F and 12R are connected to left and right front-wheel cylinders 6FL and 6FR and left and right rear-wheel cylinders 6RL and 6RR, respectively. More specifically, front-wheel brake hydraulic line 4F is connected through a line 16FL and a normal-open antiskid control valve 17FL to left front-wheel cylinder 6FL. Further, left front-wheel cylinder 6FL is connected through a normal-close antiskid control valve 18FL to a return line 19 connected to reservoir 7. Furthermore, front-wheel brake hydraulic line 4F is connected through a line 20FR and a normal-open antiskid control valve 21FR to right front-wheel cylinder 6FR. Further, right front-wheel cylinder 6FR is connected through a normal-close antiskid control valve 22FR to return line 19 connected to reservoir 7. Similarly, rear-wheel brake hydraulic line 4R is connected through a line 23RL and a normal-open antiskid control valve 24RL to left rear-wheel cylinder 6RL. Further, left rear-wheel cylinder 6RL is connected through a normal-close antiskid control valve 25RL to return line 19 connected to reservoir 7. Furthermore, rear-wheel brake hydraulic line 4R is connected through a line 26RR and a normal-open antiskid control valve 27RR to right rear-wheel cylinder 6RR. Further, right rear-wheel cylinder 6RR is connected through a normal-close antiskid control valve 28RR to return line 19 connected to reservoir 7.

Since the antiskid control executed by controlling each normal-open antiskid control valve and each normal-close antiskid control valve of each wheel 5FL, 5FR, 5RL, 5RR is the same as a commonly known control, the detailed explanation thereof is omitted. Only the schematic explanation is made hereinafter. When the wheels are not in a slipping state, that is, when a slip ratio is smaller than an ideal slip ratio corresponding to the maximum friction coefficient, the normal-open antiskid control valve and the normal-close antiskid control valve for each wheel are put in a normal state, and therefore the hydraulic pressured for the antiskid control is not supplied to each wheel cylinder. When the wheels are put in the slipping state, that is, when the slip ratio becomes greater than the ideal slip ratio, the normal-open antiskid control valve is first turned on and is put in the closed state. This closing of the normal-open antiskid control valve together with the close state of the normal-close antiskid control valve maintains the hydraulic pressure of the wheel cylinder. When the wheels still slip although the above operation is executed, the slip is prevented by decreasing the hydraulic pressure of the wheel cylinder in a manner of opening the normal-close antiskid control valve by executing the turning-on thereof.

In order to electronically control the front-wheel hydraulic pressure and the rear-wheel hydraulic pressure Pwc in the portions of front-wheel hydraulic line 4F downstream of normal-open electromagnetic valve 12F and of rear-wheel hydraulic line 4R downstream of normal-open electromagnetic valve 12R, discharge ports of pressure increasing pumps 29F and 29R are connected to the portions of front-wheel hydraulic line 4F downstream of normal-open electromagnetic valve 12F and of rear-wheel hydraulic line 4R downstream of normal-open electromagnetic valve 12R, respectively. Normal-close electromagnetic valves 30F and 30R are also connected to the portions of front-wheel hydraulic line 4F downstream of normal-open electromagnetic valve 12F and of rear-wheel hydraulic line 4R downstream of normal-open electromagnetic valve 12R, respectively. Further, suction ports of pressure increasing pumps 29F and 29R are connected to return line 19 connected to reservoir 19.

Pressure increasing pumps 29F and 29R are driven by a pressure-increasing-pump motor 31 which is electronically connected to controller 40, and therefore front-wheel brake hydraulic pressure and rear-wheel brake hydraulic pressure Pwc is increased by increasing the brake fluid supply quantity in a manner of increasing a drive duty (motor drive current) $i'_M$ applied to motor 31. On the other hand, openings of pressure decreasing valves 30F and 30R are increased from zero according to the increase of drive duty (pressure decreasing valve drive current) $i^*_V$ supplied to pressure decreasing valves 30F and 30R This increase of the openings of pressure decreasing valves 30F and 30R increases the discharge quantity of the brake fluid to return line 19, and therefore front-wheel and rear-wheel brake hydraulic pressure Pwc is decreased by this operation. That is, front-wheel brake hydraulic pressure Pwc is capable of being controlled by controlling the brake fluid supply quantity from pressure increasing pump 29F and the brake fluid discharge quantity from pressure decreasing valve 30F. Rear-wheel brake hydraulic pressure Pwc is capable of being controlled by controlling the brake fluid supply quantity from pressure increasing pump 29R and the brake fluid discharge quantity from pressure decreasing valve 30R. Pressure sensors 32F and 32R detects front-wheel brake hydraulic pressure Pwc and rear-wheel brake hydraulic pressure Pwc, respectively.

Figure 2:
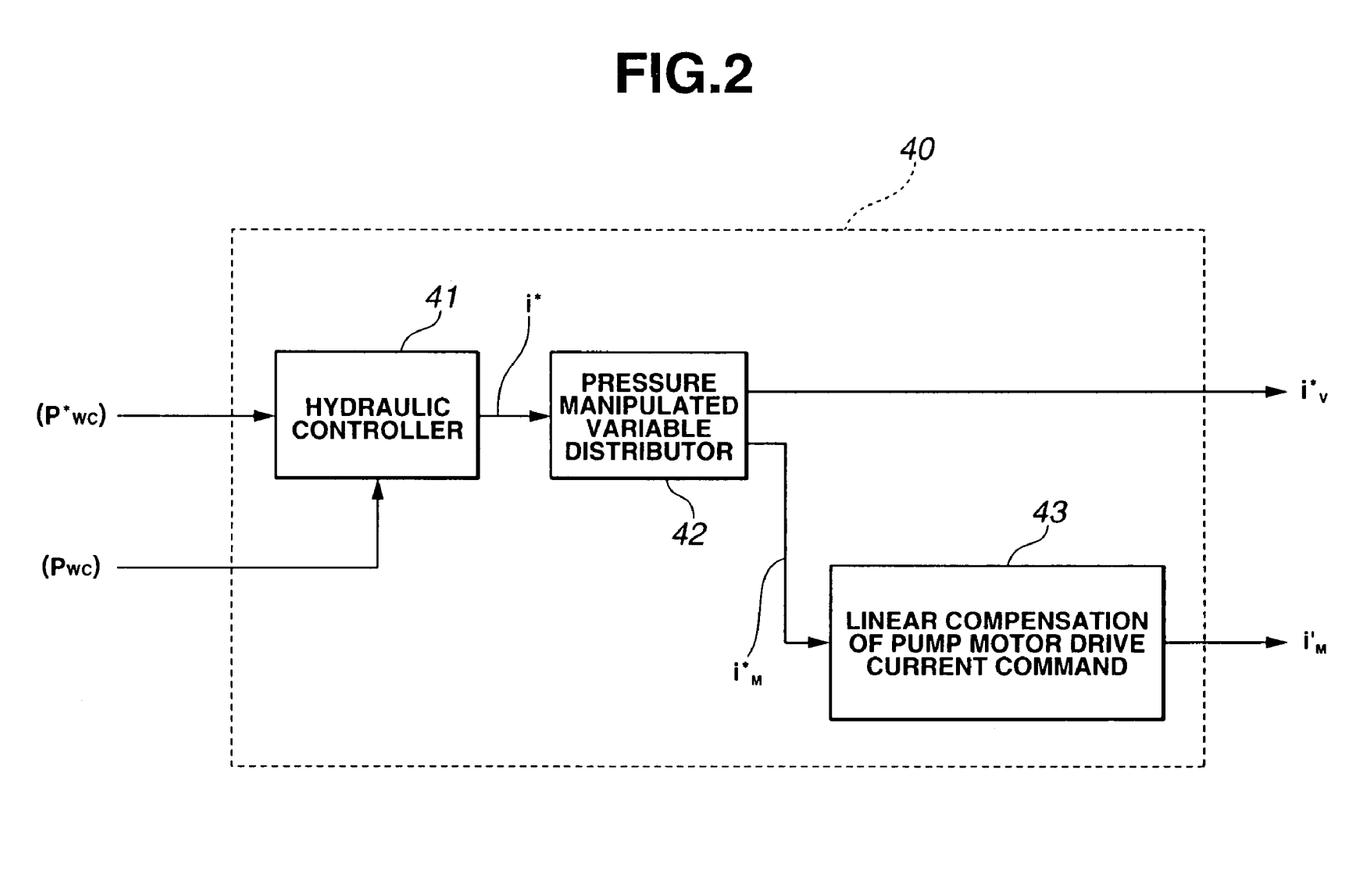
FIG. 2 is a block diagram of a brake hydraulic controller of the electronically controlled hydraulic brake control system.
Figure 3:
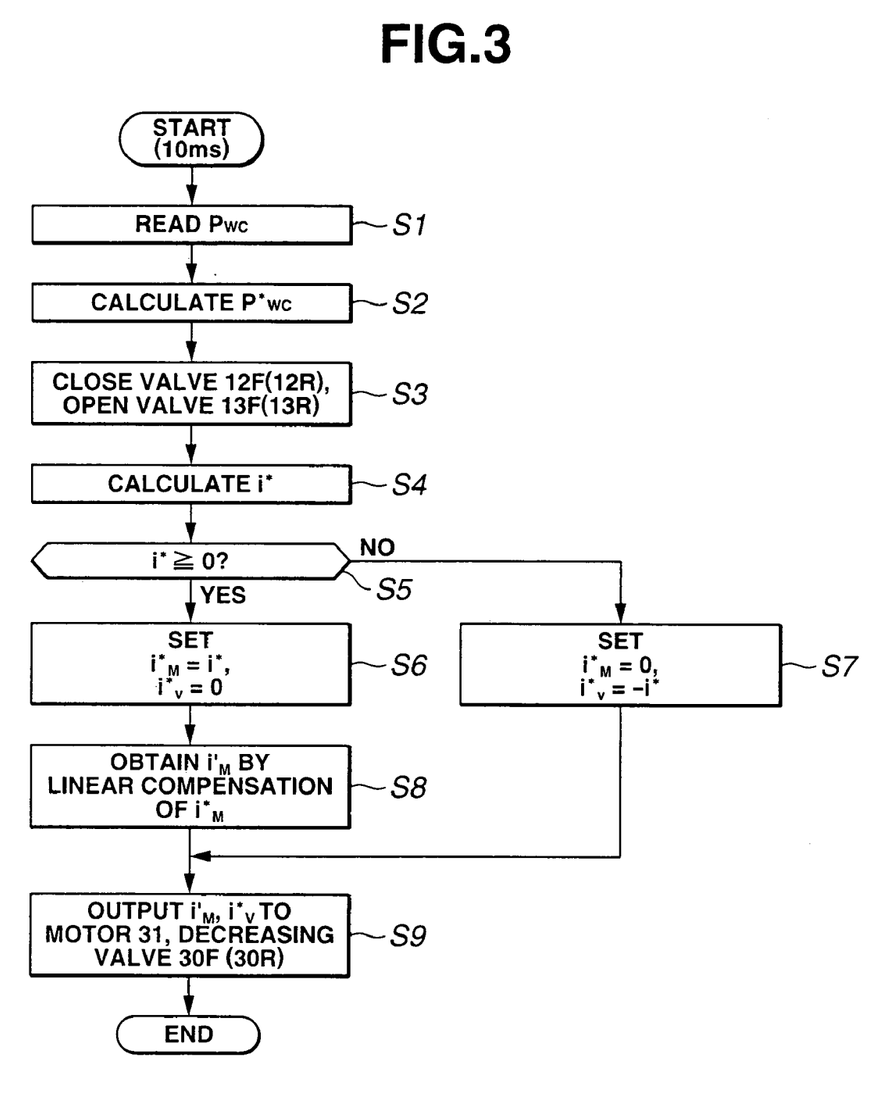
FIG. 3 is a flowchart showing a control program executed by the brake hydraulic controller.

Brake hydraulic pressure controller 40 shown in FIG. 2 executes a control program shown in FIG. 3 to execute the electronic control of front-wheel brake hydraulic pressure Pwc and rear-wheel hydraulic pressure Pwc through the control of pressure increasing pumps 29F and 29R commonly driven by motor 31 and pressure decreasing valves 30F and 30R. Although FIGS. 2 and 3 show the control for one of the front-wheel brake hydraulic pressure line and the rear-wheel hydraulic pressure line, the control of the other line is basically the same as that shown in FIGS. 2 and 3 and therefore the explanation of the control for the other line is omitted herein.

The control program shown in FIG. 3 is repeatedly executed at predetermined intervals, in this embodiment it is executed at 10 msec intervals.

At step S1 controller 40 reads actual brake hydraulic pressure Pwc from pressure sensors. At step S2 controller 40 calculates a target brake hydraulic pressure P*wc based on the detected pressures. Herein, target brake hydraulic pressure P*wc is obtained based on master cylinder pressure Pmc commanded by the driver, and is further freely determined upon taking account of the vehicle behavior control and the coordinated control using the regenerative braking.

At step S3 controller 40 closes brake hydraulic system 4F (4R) in response to the depression of brake pedal 1 (the signal of brake switch 15) by turning on normal-open electromagnetic valve 12F (12R) and opens brake hydraulic system 4F (4R) by turning on normal-closed electromagnetic valve 13F (13R) so that the driver can have a feeling of a normal operation of brake pedal 1 due to the reaction force of stroke simulator 14F (14R).

At step S4 controller 40 calculates target manipulated variable (duty ratio conversion quantity) i* of brake hydraulic system 4F (4R), by which the actual brake hydraulic pressure is brought closer to target brake hydraulic pressure P*wc, on the basis of target brake hydraulic pressure P*wc and actual brake hydraulic pressure $P_{WC}$ using a hydraulic controller 41 shown in FIG. 2.

Figure 4:
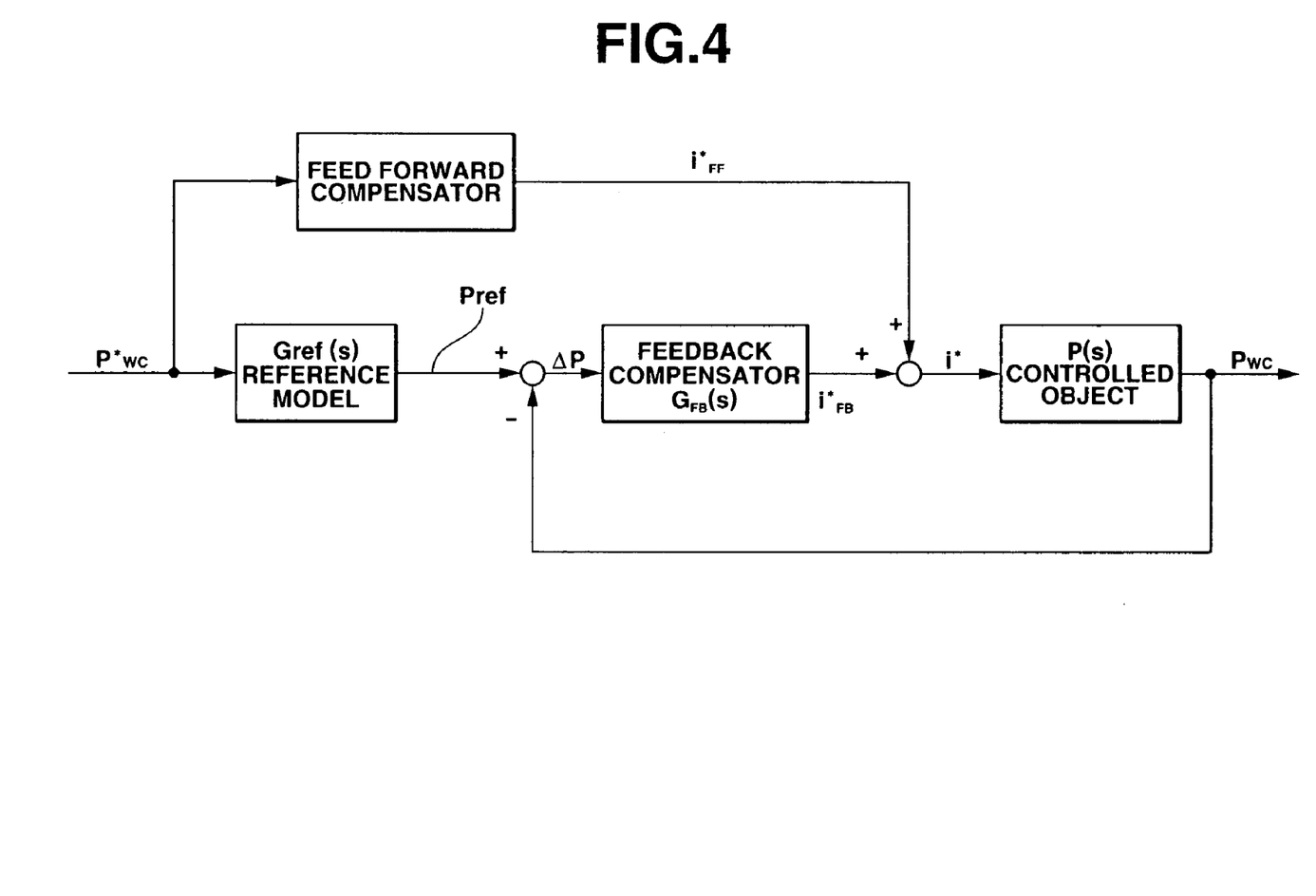
FIG. 4 is an explanatory block diagram of a hydraulic pressure controller shown in FIG. 2.

Hydraulic controller 41 comprises a feedforward compensator $G_{FF}(S)$, a reference model Gref (S), and a feedback compensator $G_{FB}(S)$ as an example employing "a two-degree-of-freedom control method" shown in FIG. 4. Feedback compensator $G_{FB}(S)$ modulates a stability, a disturbance durability and a close-loop performance of the control system, and feedforward compensator $G_{FF}(S)$ basically modulates a responsibility of actual brake hydraulic pressure Pwc with respect to target brake hydraulic pressure P*wc basically in case that there is no model error. Herein, feedforward compensator $G_{FF}(S)$ is represented by the following expression (1).

$$G_{FF}(S)=S/(Tref \cdot S+1) \quad (1)$$

where Tref is a time constant, and S is Laplace operator. Reference model Gref(S) is represented by the following expression (2).

$$Gref(S)=1/(Tref \cdot S+1) \quad (2)$$

where Tref is the time constant. Feedback compensator $G_{FB}(S)$ is represented by the following expression (3).

$$G_{FB}(S)=(Kp \cdot S+Ki)/S \quad (3)$$

where Kp is a proportion control constant, and Ki is an integral control constant.

In order to correspond a response characteristic P(S) of the controlled object to reference model characteristic Gref(S), a feed-forward manipulated variable $i^*_{FF}$ is calculated by executing a feedforward compensation (phase compensation) in a manner of processing target brake hydraulic pressure P*wc using feed-forward compensator $G_{FF}(S)$. Subsequently, reference brake hydraulic pressure Pref shown by a curve C in FIG. 9 is calculated by processing target brake hydraulic pressure $P^*_{WC}$ using reference model Gref(S). Further, a brake hydraulic pressure deviation (difference) ΔP between reference brake hydraulic pressure Pref and actual brake hydraulic pressure Pwc (ΔP=Pref−Pwc) is calculated. A feedback manipulated variable $i^*_{FB}$ is calculated by executing a feedback compensation in a manner of processing brake hydraulic pressure difference ΔP using feedback compensator $G_{FB}(S)$. Finally, a target manipulated variable i* is obtained by adding feed-forward manipulated variable $i^*_{FF}$ and feedback manipulated variable $i^*_{FB}$ ($i^*=i^*_{FF}+i^*_{FB}$). Actually, these calculations are executed upon putting the above expressions into the discrete form.

At steps S5 through S7 in FIG. 3, pressure increase and decrease manipulated variable distributor 42 distributes target manipulated variable i* of brake hydraulic system (line) 4F (4F) into drive current command value i* of pressure decreasing value 30F (30R) and drive current command value $i^*_M$. More specifically, at step S5 controller 40 checks the polarity of target manipulated variable i* of pressure decreasing value 30F (30R) by determining whether or not target manipulated variable i* is greater than or equal to zero (i*≧0). When the determination at step S5 is affirmative, that is, when target manipulated variable i* is a positive value, the program proceeds to step S6 wherein controller 40 sets drive current command value $i^*_M$ of pressure increasing pump motor 31 at target manipulated variable i* ($i^*_M=i^*$) and sets pressure decreasing valve drive current command value target manipulated variable $i^*_V$ at zero ($i^*_V=0$). When the determination at step S5 is negative, that is, when target manipulated variable i* is a negative value, the program proceeds to step S7 wherein controller 40 sets drive current command value $i^*_M$ of pressure increasing pump motor 31 at zero($i^*_M=0$) so as to stop motor 31 and sets pressure-decreasing-valve drive current command value $i^*_V$ at target manipulated variable i* ($i^*_V=-i^*$).

In case that drive current command value $i^*_M$ of pressure increasing pump motor 31 is set at target manipulated variable i* ($i^*_M=i^*$) at step S6 in FIG. 3, if the drive control of pressure increasing pump motor 31 is executed using this set value directly, there is caused a response delay of braking as shown by a curve B in FIG. 9, due to the non-liner characteristic of brake hydraulic pressure Pwc discussed in the explanation of FIG. 12. In order to solve this problem, at step S8 in FIG. 3, controller 40 obtains a linear-compensation-executed pressure-increasing-pump drive current command value $i'_M$ which is employed in the linear compensation of the non-linear characteristic of brake hydraulic pressure Pwc shown in FIG. 12 using a linear compensator 43 in FIG. 2.

Figure 5A:
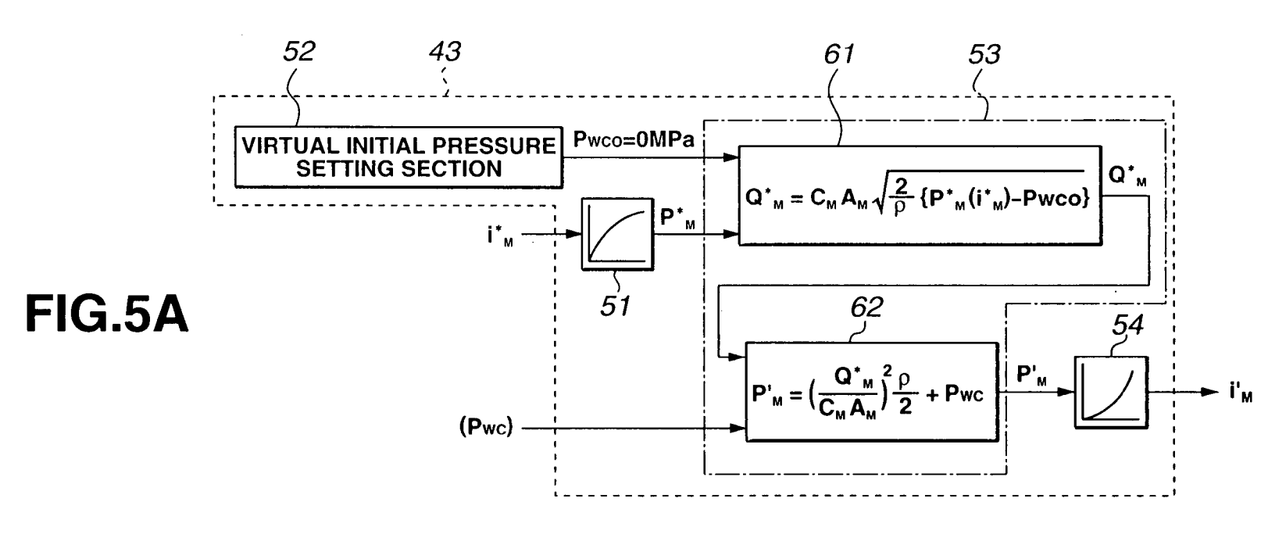
FIG. 5A is a block diagram of a linear compensator in FIG. 2 in case of employing a pump flow model.

Linear compensator 43 in FIG. 2 is constructed by an attainment brake hydraulic pressure calculating section 51, a virtual initial pressure setting section 52, an attainment brake hydraulic pressure compensating section 53 and a linear-compensation-executed pressure-increasing-pump drive current command value calculating section 54, as shown in FIG. 5A. Attainment brake hydraulic pressure calculating section 51 calculates an attainment brake hydraulic pressure $P^*_M$ which is an attainable maximum brake hydraulic pressure attained by pressure increasing pump 29F (29R) when motor 31 is driven by drive current command value $i^*_M$, using an attainment brake hydraulic pressure map and a predetermined function. Virtual initial pressure setting section 52 sets a virtual initial pressure Pwco which is virtually set as an initial value of the brake hydraulic pressure. Normally, this virtual initial pressure Pwco is set at zero MPa.

Attainment brake hydraulic pressure compensation section 53 obtains a linear-compensation-executed attainment brake hydraulic pressure $P'_M$ by executing the linear compensation of attainment brake hydraulic pressure $P^*_M$ through the addition of actual brake hydraulic pressure Pwc. Attainment brake hydraulic pressure compensation section 53 is constructed by an ideal flow rate calculating section 61 and a linear-compensation-executed attainment brake hydraulic pressure calculating section 62. Ideal flow rate calculating section 61 calculates an ideal flow rate $Q^*_M$ of pressure increasing pump, which is obtained as a matter of course when virtual initial pressure Pwco is employed as a standard under attainment brake hydraulic pressure $P^*_M$, using the following hydrodynamic flow-rate expression (4) representatively based on Bernoulli's theorem.

$$Q^*_M = C_M \cdot A_M \{(2/\rho)[P^*_M(I^*_M) - Pwco]\}^{1/2} \quad (4)$$

where $Q^*_M$ is ideal flow rate of pressure increasing pump, $C_M$ is a flow rate coefficient (a fixed value), $A_M$ is an orifice opening area of pressure increasing pump 29F (29R) as same as that in FIG. 11, $\rho$ is a fluid specific gravity, $P^*_M$ is attainment brake hydraulic pressure, $I^*_M$ is pressure increasing pump (motor) drive current command value, and Pwco is the virtual initial pressure.

Linear-compensation-executed attainment brake hydraulic pressure calculating section 62 obtains a linear-compensation-executed attainment brake hydraulic pressure $P'_M$, which is obtained as a matter of course when the ideal flow rate $Q^*_M$ is ensured from the present actual brake hydraulic pressure Pwc, using the inverse calculation of the expression (1) from actual brake hydraulic pressure Pwc and ideal flow rate $Q^*_M$. Linear-compensation-executed pressure increasing pump drive current command value calculating section 54 obtains a linear-compensation-executed motor drive current command value $i'_M$ based on linear-compensation-executed attainment brake hydraulic pressure $P'_M$ by executing the inverse calculation of the calculation executed in attainment brake hydraulic pressure calculation section 51, that is, by executing an inverse index of the attainment brake hydraulic pressure map employed in attainment brake hydraulic pressure calculating section 51 or by using a predetermined inverse function.

Figure 7:
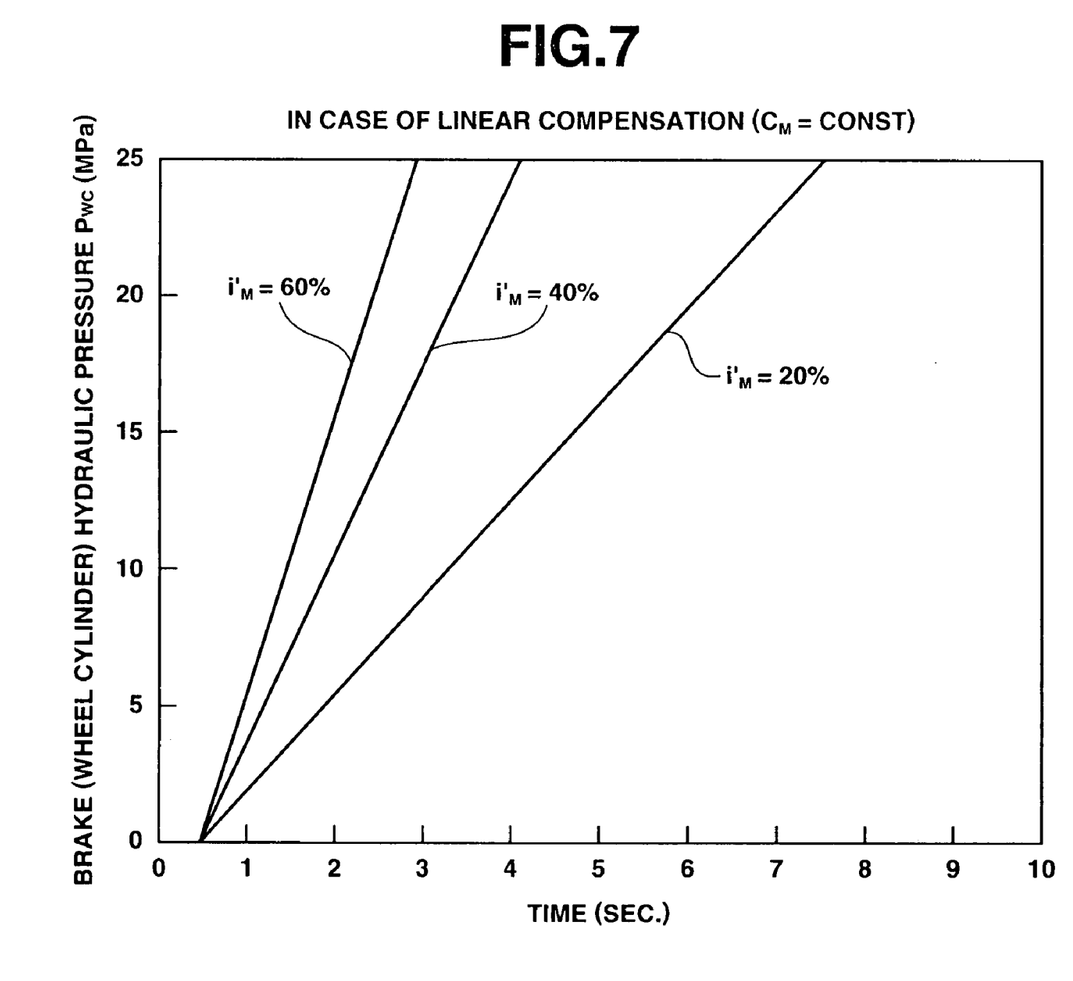
FIG. 7 is a time chart showing a time-series variation of a brake hydraulic pressure in case of employing the linear compensator shown in FIGS. 5A and 5B.

At step S9 subsequent to the execution of step S8, controller 40 executes the drive control by outputting linear-compensation-executed motor drive current command value $i'_M$ obtained at step S8 which corresponds to linear compensator 43 in FIG. 2 and pressure-decreasing-valve drive current command value $i^*_V$ obtained at step S6 or S7 to pressure increasing pump motor 31 and pressure decreasing valve 30F (30R), respectively. Pressure-decreasing linear-compensation-executed motor drive current command value $i'_M$ compensates the flow rate characteristic of pressure increasing pump 29F (29R) so as to perform the same characteristic as that in virtual initial pressure Pwco (=0 MPa). Accordingly it becomes possible to linearize the non-linear characteristic shown in FIG. 12 into the linear characteristic shown in FIG. 7. Explaining as to FIG. 9, by improving a step response of brake hydraulic pressure Pwc from a curve B representative of a conventional characteristic to a curve D, the improved step response becomes very close to reference brake hydraulic pressure Pref shown by the curve C. This decreases the response delay of braking and solves the problem of a brake response.

Attainment brake hydraulic pressure compensation section 53 obtains ideal flow rate $Q^*_M$ of pressure increasing pump from attainment brake hydraulic pressure $P^*_M$ and virtual initial pressure Pwc0 using a flow rate model (function or map) in calculating section 61. Further, linear compensation executed attainment brake hydraulic pressure $P'_M$ is obtained from ideal flow rate $Q^*_M$ and actual brake hydraulic pressure Pwc from an inverse flow rate model (inverse function or inverse map) in calculating section 62. Accordingly, the flow rate characteristic of pressure increasing pump can be represented by a flow rate model wherein inputs are attainment brake hydraulic pressure $P^*_M$, virtual initial pressure Pwco and actual brake hydraulic pressure Pwc. It becomes possible to freely obtain the flow rate characteristic as same as that in a virtual hydraulic state. Therefore, the characteristic of hydraulic pressure change ratio with respect to pressure increasing pump (motor) drive current command value $i^*_M$ is linearized without being affected by actual brake hydraulic pressure Pwc. Particularly, since attainment brake hydraulic pressure $P^*_M$ is not changed by pressure increasing pump (motor) drive current command value $i^*_M$, the linearization of the flow rate characteristic is securely ensured in the necessary hydraulic pressure range.

Although flow rate coefficient $C_M$ in the flow rate equation varies according to unattained brake hydraulic pressure quantity between the control state brake hydraulic pressure and control finish brake hydraulic pressure which are deeply related to the pump flow rate, in case that the above functions and advantages are ensured by approximating the flow rate coefficient $C_M$ at a fixed value, it is possible to treat flow rate coefficient $C_M$ as a fixed value. In this case, the equation of the flow rate model employed in ideal flow rate calculation section 61 and the equation of the inverse model employed in linear compensation executed attainment brake hydraulic pressure calculating section 62 in FIG. 5A have terms to be cancelled with each other when they are aligned together. Therefore, attainment brake hydraulic pressure compensation section 53 of linear compensator 43 is expressed by a simple form as shown in FIG. 5B.

Figure 5B:
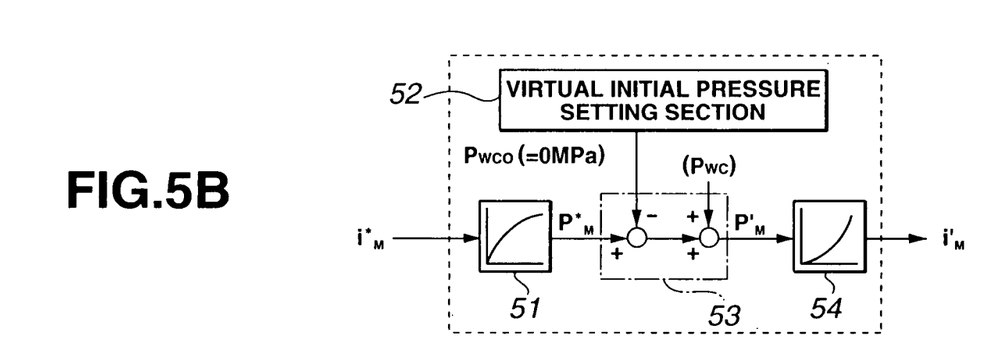
FIG. 5B is a block diagram of a linear compensator in FIG. 2 in case of employing a simplified linear compensator.

As is apparent from FIG. 5B, attainment brake hydraulic pressure compensation section 53 is arranged to obtain linear-compensation-executed attainment brake hydraulic pressure $P'_M$ by adding actual brake hydraulic pressure Pwc and a value $(P^*_M - Pwco)$ obtained by subtracting virtual initial pressure Pwco(=0MPa) set at virtual initial pressure setting section 52 from attainment brake hydraulic pressure $P^*_M$ obtained at attainment brake hydraulic pressure calculating section 51. This arrangement simplifies the structure of the control model and simplifies the calculations, and therefore the total cost of the system is largely decreased. Further, unattained brake hydraulic pressure between attainment brake hydraulic pressure $P^*_M$ and actual brake hydraulic pressure Pwc which are deeply related to the pump flow rate, is employed in the linear compensation, the linear compensation is further accurately executed.

Figure 6:
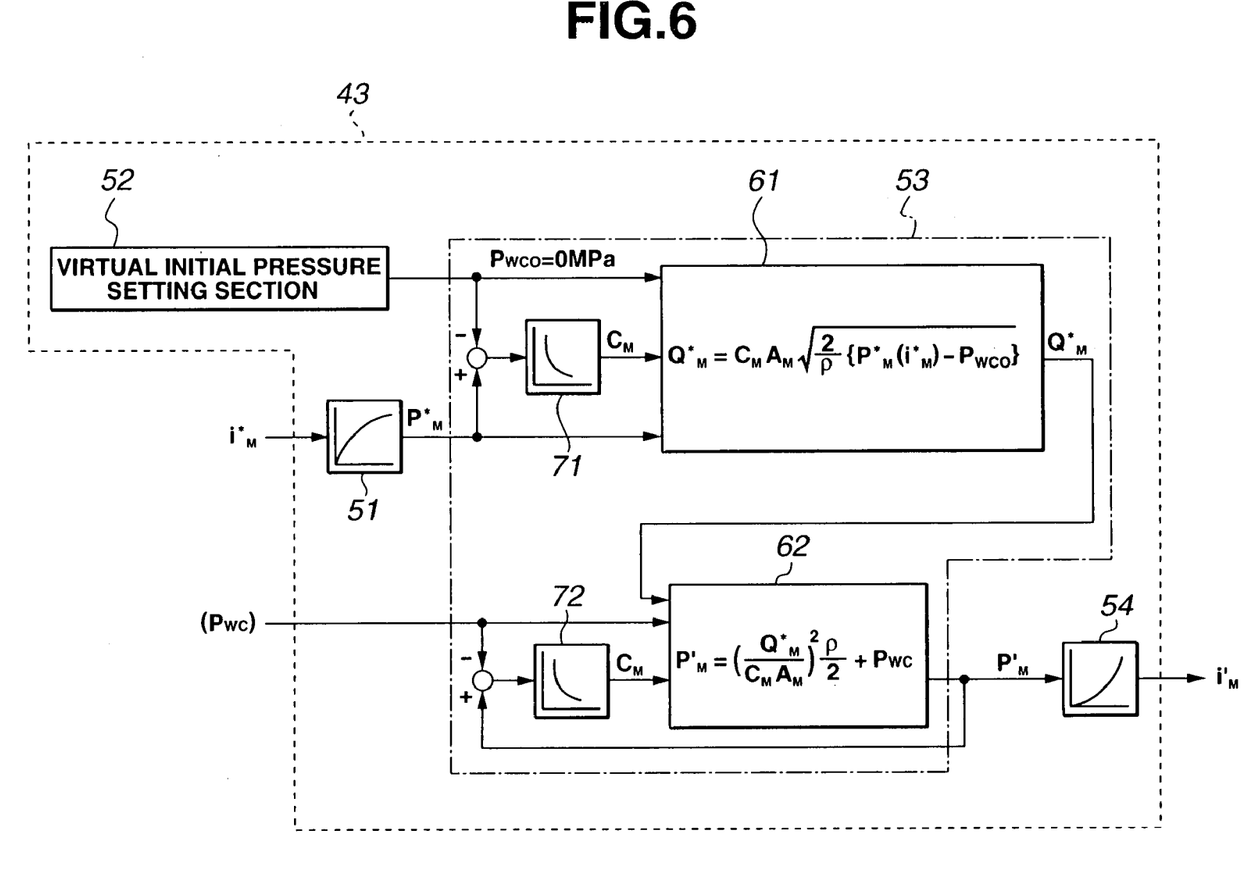
FIG. 6 is a block diagram showing another linear compensator applicable to the brake hydraulic controller in FIG. 2.

FIG. 6 shows a modification of the embodiment which is applicable to a case that flow rate coefficient $C_M$ in the flow rate equation is largely varied according to the unattained brake hydraulic pressure quantity and therefore the above discussed functions and advantages are not ensured if flow rate coefficient $C_M$ is set at a fixed value. In this modification, flow rate coefficient $C_M$ in the flow rate model and an inverse model using in ideal flow rate calculation section 61 and linear compensation executed attainment brake hydraulic pressure calculation section 63 is not set at a fixed value and is treated as a variable which is sequentially obtained in flow rate coefficient calculating sections 71 and 72.

Flow rate coefficient calculating section 71 obtains flow rate coefficient $C_M$ from unattained brake hydraulic pressure quantity $(P^*_M - Pwco)$ which is a difference between actual brake hydraulic pressure Pwco and attainment brake hydraulic pressure $P^*_M$, using a predetermined map or predetermined function, and the obtained flow rate coefficient $C_M$ is employed in the calculation by ideal flow rate calculation section 61. Flow rate coefficient calculating section 72 obtains flow rate coefficient $C_M$ from unattained brake hydraulic pressure quantity $(P'_M - Pwco)$ which is a difference between actual brake hydraulic pressure Pwco and linear compensation executed attainment brake hydraulic pressure $P'_M$, using a predetermined map or predetermined function, and the obtained flow rate coefficient $C_M$ is employed in the calculation by linear compensation executed attainment brake hydraulic pressure calculation section 62.

Figure 8:
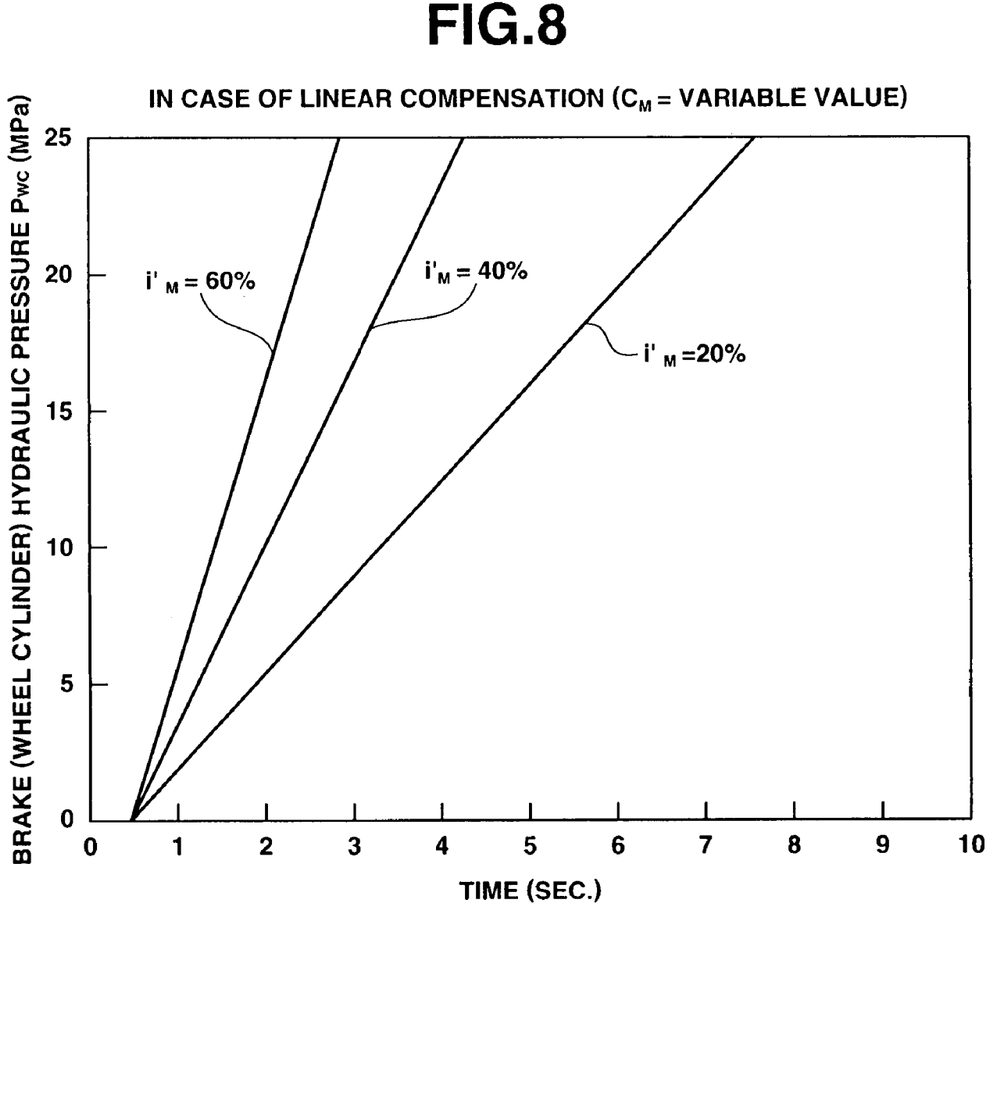
FIG. 8 is a time chart showing a time-series variation of a brake hydraulic pressure in case of employing the linear compensator shown in FIG. 6.

With this modification, even if flow rate coefficient $C_M$ is largely varied according to the unattained brake hydraulic pressure quantity between the control start brake hydraulic pressure and control finish brake hydraulic pressure, it is possible to process the time-series change characteristic of brake hydraulic pressure Pwc by the linear compensation as shown in FIG. 8, so that the step response of the brake hydraulic pressure Pwc closely approaches the reference break hydraulic pressure Pref shown by curve C in FIG. 9 by improving the response into a characteristic represented by curve D in FIG. 9. This compensation decreases the response delay of brake and solves the problem as to the insufficiency of the brake response.

This application is based on Japanese Patent Application No. 2003-45824 filed on Feb. 24, 2003 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An electronically controlled hydraulic brake system, comprising:
   a pressure increasing pump which increases a brake hydraulic pressure in a brake hydraulic line;
   a motor connected to the pressure increasing pump, the motor being controlled on the basis of a motor drive current command value to bring the brake hydraulic pressure to a target brake hydraulic pressure;
   a pressure detector which detects an actual hydraulic pressure in the brake hydraulic line; and
   a controller connected to the motor and the pressure detector, the controller being arranged
   to calculate an attainment brake hydraulic pressure, which is a maximum brake hydraulic pressure attained when the motor operates in response to the motor drive current command value,
   to obtain a linear compensation executed attainment brake hydraulic pressure by linearly compensating the attainment brake hydraulic pressure using the actual brake hydraulic pressure,
   to obtain a linear compensation executed motor drive current command value by executing an inverse calculation of a calculation for obtaining the linear compensation executed attainment brake hydraulic pressure, and
   to control the motor based on the linear compensation executed motor drive current command value.

2. The electronically controlled hydraulic brake system as claimed in claim 1, wherein the controller is further arranged to set a virtual initial pressure estimated as an initial value of the brake hydraulic pressure, and to obtain the linear compensation executed attainment brake hydraulic pressure by adding the actual brake hydraulic pressure to a value obtained by subtracting the virtual initial pressure from the attainment brake hydraulic pressure.

3. The electronically controlled hydraulic brake system as claimed in claim 2, wherein the controller is further arranged to obtain an ideal flow rate of brake fluid by the pressure increasing pump, and to obtain the linear compensation executed attainment brake hydraulic pressure from the ideal flow rate and the actual brake hydraulic pressure.

4. The electronically controlled hydraulic brake system as claimed in claim 3, wherein the controller is further arranged to obtain the ideal flow rate using a flow rate equation based on fluid dynamics and to obtain the linear compensation executed attainment brake hydraulic pressure by executing an inverse calculation of the flow rate equation.

5. The electronically controlled hydraulic brake system as claimed in claim 4, wherein a flow rate coefficient in the flow rate equation is a fixed value.

6. The electronically controlled hydraulic brake system as claimed in claim 4, wherein a flow rate coefficient in the flow rate equation is a variable which is varied according to an unattained pressure between a control start brake hydraulic pressure and a control finish brake hydraulic pressure.

7. The electronically controlled hydraulic brake system as claimed in claim 1, further comprising a pressure decreasing valve which is disposed in the brake hydraulic line and is connected to the controller, the controller controls the pressure decreasing valve to decrease the actual brake hydraulic pressure.

8. The electronically controlled hydraulic brake system as claimed in claim 7, wherein the controller controls the motor when the actual brake hydraulic pressure is to be increased, and controls the pressure decreasing valve when the actual brake hydraulic pressure is to be decreased.

9. An electronically controlled hydraulic brake system which electronically controls a brake hydraulic pressure in a brake hydraulic line for a vehicle by outputting a motor drive current command value to a motor of a pressure increasing pump for increasing the brake hydraulic pressure, the electronically controlled hydraulic brake system comprising:
   a controller arranged to execute a linear compensation of a maximum brake hydraulic pressure attained when the motor operates in response to a motor drive current command value, and to obtain the motor drive current command value by executing an inverse calculation of a calculation for obtaining the linear compensation executed maximum brake hydraulic pressure.

10. A method of electronically controlling a brake hydraulic pressure in a brake hydraulic line through a control of a motor of a pressure increasing pump which increases the brake hydraulic pressure, the method comprising:
   calculating an attainment brake hydraulic pressure, which is a maximum brake hydraulic pressure attained when a motor of a pressure increasing pump operates in response to a motor drive current command value;
   obtaining a linear compensation executed attainment brake hydraulic pressure by linearly compensating the attainment brake hydraulic pressure using an actually detected brake hydraulic pressure in the brake hydraulic line;
   obtaining a linear compensation executed motor drive current command value by executing an inverse calculation of a calculation for obtaining the linear compensation executed attainment brake hydraulic pressure, and
   controlling the motor based on the linear compensation executed motor drive current command value.

11. An electronically controlled hydraulic brake system which controls a motor of a pressure increasing pump on the basis of a motor drive current command value obtained from a target brake hydraulic pressure to bring the brake hydraulic pressure to the target brake hydraulic pressure, the electronically controlled hydraulic brake system comprising:

attainment brake hydraulic pressure calculating means for calculating an attainment brake hydraulic pressure, which is a maximum brake hydraulic pressure attained when the motor drive current command value is applied to the motor;

attainment brake hydraulic pressure compensating means for obtaining a linear compensation executed attainment brake hydraulic pressure by linearly compensating the attainment brake hydraulic pressure using an actual brake hydraulic pressure;

linear compensation executed motor drive current command value calculating means for obtaining a linear compensation executed motor drive current command value by executing an inverse calculation of a calculation executed at the attainment brake hydraulic pressure compensating means on the basis of the linear compensation executed attainment brake hydraulic pressure; and control means for controlling the motor based on the linear compensation executed motor drive current command value.

* * * * *